United States Patent

Bschorr et al.

[11] Patent Number: 6,119,404
[45] Date of Patent: Sep. 19, 2000

[54] DEVICE FOR AVOIDING SQUEAKING NOISES ON A WINDOW PANE

[75] Inventors: Oskar Bschorr, München; Martin Abendschein, Stuttgart, both of Germany

[73] Assignee: DaimlerChrysler AG, Stuttgart, Germany

[21] Appl. No.: 08/408,006

[22] Filed: Mar. 22, 1995

[51] Int. Cl.[7] .................................................. E06B 7/22
[52] U.S. Cl. ............................... 49/498.1; 49/490.1
[58] Field of Search ............................. 49/498.1, 490.1, 49/377, 415

[56] References Cited

U.S. PATENT DOCUMENTS

| | | | |
|---|---|---|---|
| 2,659,117 | 11/1953 | Spraragen | 49/490.1 |
| 2,746,103 | 5/1956 | Bright | 49/490.1 |
| 3,625,789 | 12/1971 | Gerhardt | 49/490.1 |
| 4,123,100 | 10/1978 | Ellis | 49/490.1 |
| 4,668,556 | 5/1987 | Hermann et al. | 49/490.1 |
| 4,813,184 | 3/1989 | Weimar | 49/490.1 |
| 4,925,237 | 5/1990 | Böhn et al. | 49/490.1 |
| 5,009,947 | 4/1991 | McManus et al. | 49/490.1 |
| 5,123,693 | 6/1992 | Karashima et al. | 49/490.1 |
| 5,174,066 | 12/1992 | Dupuy | 49/377 |
| 5,388,371 | 2/1995 | Nozaki | 49/377 |

FOREIGN PATENT DOCUMENTS

| | | |
|---|---|---|
| 0 489 537 | 6/1992 | European Pat. Off. . |
| 2528489 | 12/1983 | France ........ 49/493.1 |
| 33 01 935 | 8/1983 | Germany . |
| 40 40 037 | 6/1992 | Germany . |
| 41 19 704 | 12/1992 | Germany . |
| 4092721 | 3/1992 | Japan ........ 49/377 |
| 4163226 | 6/1992 | Japan ........ 49/377 |

OTHER PUBLICATIONS

US Patent #2,699,581 Schlegel Jan. 18, 1955.
3159886 W.R. Lynch Dec. 8, 1964.
"Theoretical Acoustics," P. Morse et al., Princeton University Press, Princeton, N.J., 1968, pp. vii, 840–845.

*Primary Examiner*—Daniel P. Stodola
*Assistant Examiner*—Curtis A. Cohen
*Attorney, Agent, or Firm*—Evenson, McKeown, Edwards & Lenahan, P.L.L.C.

[57] ABSTRACT

An arrangement for avoiding self-excited frictional vibrations between two contacting bodies which move relative to one another, such as a vehicle window and a sealing element which rests thereon. The sealing element is made in the form of a hollow strip, and vibration damping materials or elements are mounted on either the interior or exterior thereof.

14 Claims, 6 Drawing Sheets

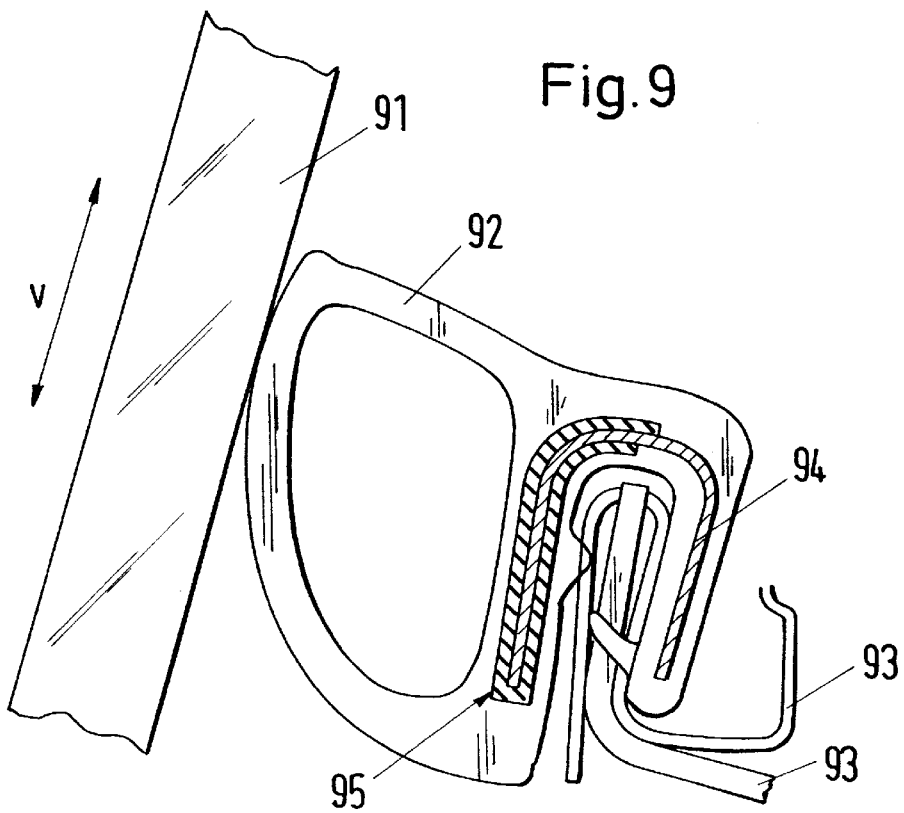
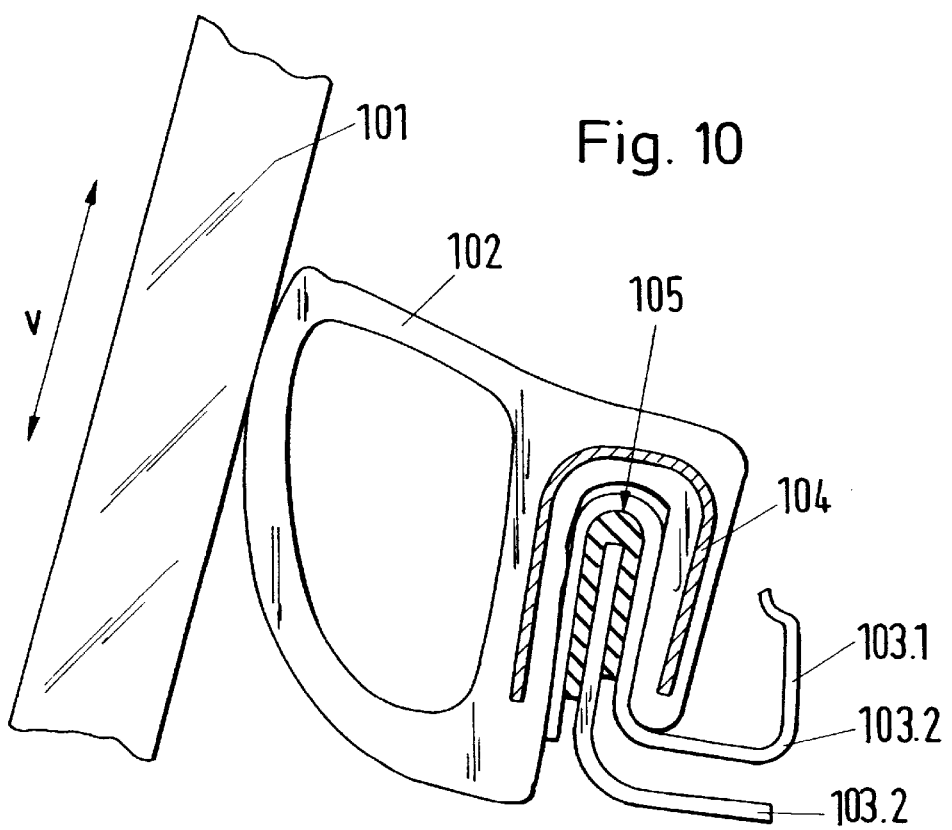

DEVICE FOR AVOIDING SQUEAKING NOISES ON A WINDOW PANE

BACKGROUND AND SUMMARY OF THE INVENTION

This invention relates to a device for avoiding squeaking noises on a window pane, particularly a passenger car side window which can be displaced transversely to a seal resting against the pane.

Self-excited frictional vibrations, which are also known as "slip stick effect", cause squeaking noises when passenger car side windows, which are sealed off with respect to the vehicle body by tight fitting seals, are moved up and down. Generally, it is attempted to avoid the slip stick effect by optimizing of system parameters, such as the mass, stiffness and geometry of the window and seals. As a result of complex friction and damping mechanisms, high-cost theoretical and experimental tests are required for this purpose which, however, do not necessarily guarantee success. Experiments have demonstrated that movements without jerking are possible only in the case of low surface pressures.

A problem which is particularly difficult to solve from an engineering point of view is the squeaking noise which is caused by the sliding of smooth surfaces, such as window panes, on elastic materials, such as seals. Such squeaking noises are particularly annoying in the case of motor-driven passenger car side windows which are moved up or down at a constant speed.

German Patent Document DE 41 19 704 A1 and European Patent Document EP 0 489 537 A1 disclose window seals for passenger car doors in which the contact force of the seal against the pane is reduced during the pane movement, in order to reduce the motor power required to move the pane. Furthermore, velvet-type coverings on seals are known which also reduce the friction, but wear off over time.

From German Patent Document DE 33 01 935 A1 or German Patent Document DE 40 40 037 A1, sealing strips are known which are made of a flexible material into which reinforcing bodies are worked for increasing the flexural strength of the sealing strip or rendering it more durable.

It is an object of the present invention to eliminate the squeaking noises which occur when the window panes, particularly passenger car side windows, are moved up or down, without any impairment of their tightness in the closed condition.

This object is achieved by means of the sealing arrangement according to the invention, in which a window seal is provided in the form of a hollow profile strip that is connected to a vibration damper element.

Other objects, advantages and novel features of the present invention will become apparent from the following detailed description of the invention when considered in conjunction with the accompanying drawings.

BRIEF DESCRIPTION OF THE DRAWINGS

FIGS. 2–11 are broken away cross-sectional views of various embodiments of the sealing element according to the invention.

DETAILED DESCRIPTION OF THE DRAWINGS

Figure 1:
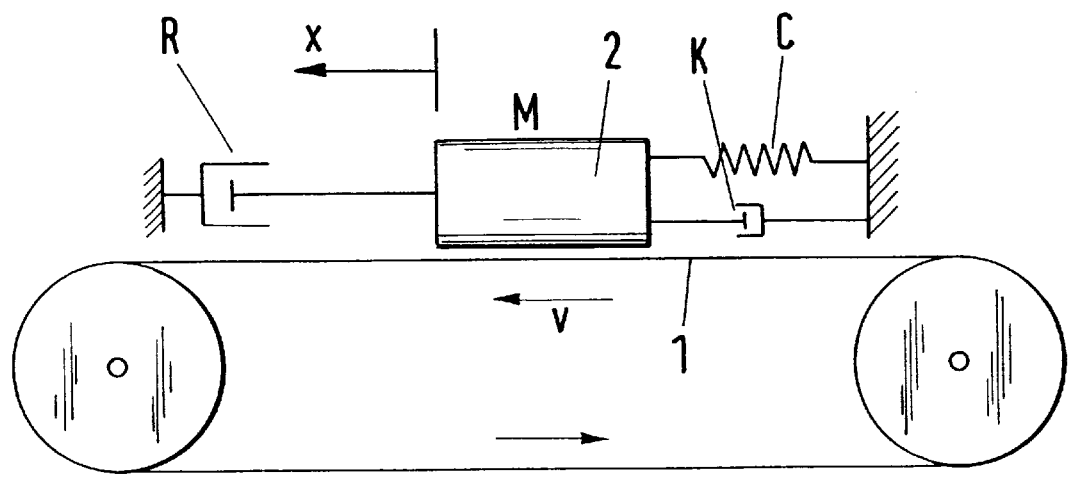
FIG. 1 is a schematic diagram which illustrates the operating principles of the sealing arrangement according to the invention.

In the schematically illustrated embodiment of FIG. 1, a belt 1 moves at a speed v under a body 2 which has a mass M. Generally, M represents the modal mass for a frictional vibration with the natural frequency $\omega$; C defines the modal spring constant, and K defines the modal damping of such a frictional vibrator. In this case, the natural frequency $\omega$ is determined by the relationship $$\omega = \sqrt{C/M}.$$

Between the belt 1 and the body 2, a frictional force F (v−$\dot{x}$) will occur as a function of the relative speed v−$\dot{x}$ derived by superimposing the speed v with the vibrating speed $\dot{x}$ and in a linear approximation (Taylor's series). This frictional force can be described as follows:

$$F(v-\dot{x})=F(v)-F_1\cdot\dot{x}$$

(see also, P. M. Morse, K. U. Ingard, "Theoretical Acoustic", McGraw-Hill, 1968, Page 841, and on). Therein, $\dot{x}=\delta x/\delta t$ is the vibrating speed of the body 2, and $F_1=\delta F(v)/\delta v$ is the first derivative of F(v) in the development of Taylor's series. In considering vibrations, the constant proportion of the frictional force F(v) may be disregarded. Thus, for a self-excited frictional vibration, the following motion equation will be obtained:

$$M\cdot\ddot{x}+(K-F_1)\cdot\dot{x}+C\cdot x=0.$$

A frictional vibration occurs as long as the term (K−$F_1$) is negative.

According to the invention, an additional damping element, for example, in the form of a vibration damper or absorber, which is known per se, and which has an additional modal damping R, is mounted on the vibrating system consisting of the belt 1 and the body 2. If this additional damping element R is dimensioned such that the condition $$K-F_1+R>0$$

is met, the whole system of the moving belt 1 and the rubbing body 2 will remain stable, and there will be no frictional vibrations.

FIGS. 2–10 are partially schematic illustrations which show the construction details of alternative embodiments of a seal for lateral windows of a passenger car according to the invention. In each case, a cross-section is shown through the so-called shaft sealing on the inside of the door, the end digits of the reference numbers always being the same or similar for identical parts.

In the embodiments illustrated in FIGS. 2 to 10, a strip-shaped seal 22, 32, . . . 102, which is made of a hollow profile of rubber or a similar elastic material, rests against a side window pane 21, 31, . . . 101 which can be vertically displaced at a speed v. The seal is fastened on a holding device 23, 33, . . . 103 by means of a U-shaped clamping part which is integrated into the seal and into which a correspondingly shaped internal reinforcement 24, 34, . . . 104 is integrated.

Figure 2:
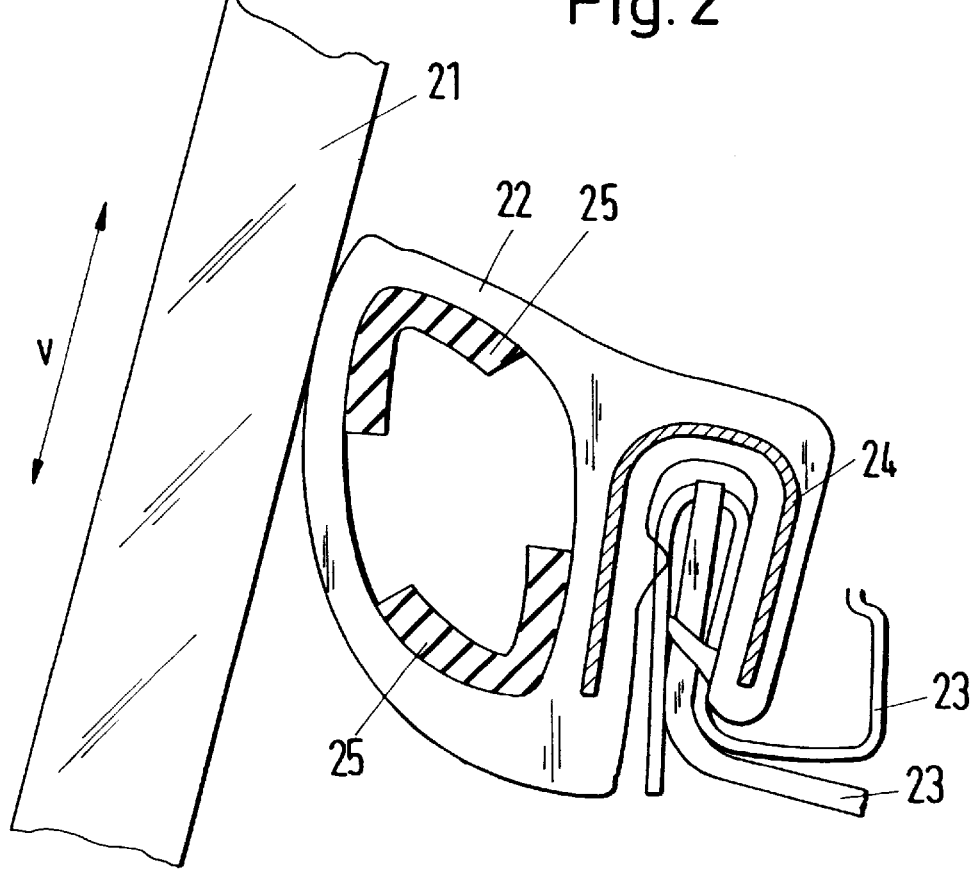

In the embodiment illustrated in FIG. 2, a damping coating 25 is situated in the interior of the tube-shaped seal 22 at the points of maximal deformation in the case of a movement caused by friction on the moving window pane 21. This damping coating 25 may consist, for example, of a high-damping elastomer, elastomer foam or a so-called "pressed-in coating".

Figure 3:
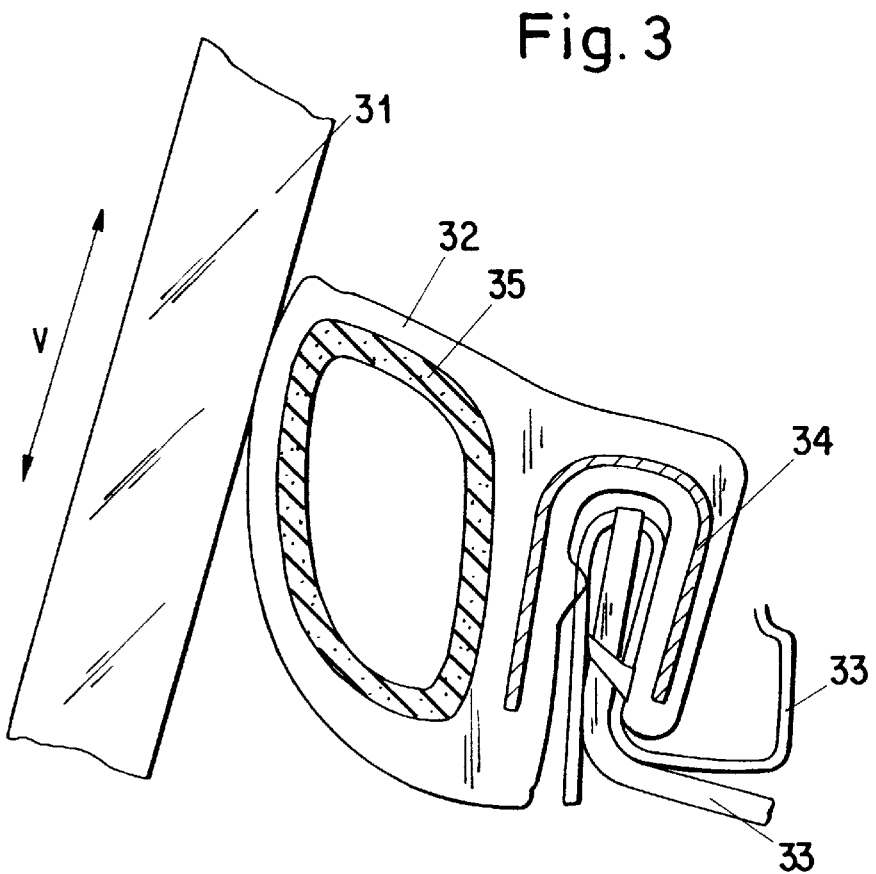
Figure 4:
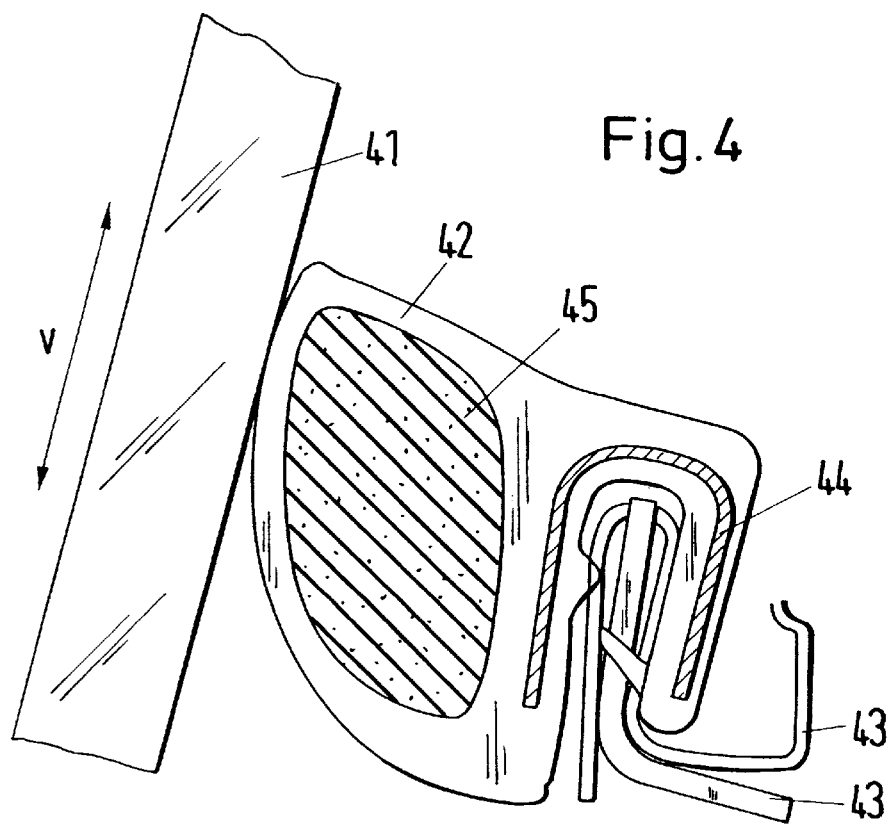
Figure 5:
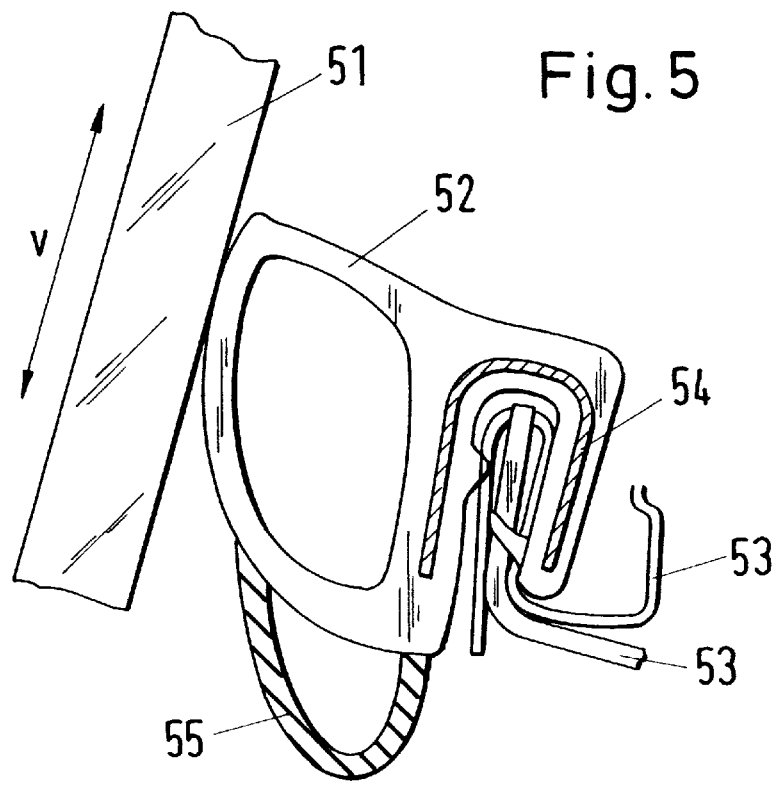

In the embodiment illustrated in FIG. 3, the complete interior wall of the seal is covered with a co-called "sound deadening coating" or a "pressed-in coating", while in FIG. 4, the complete interior of the seal 42 is filled with a damping elastomer foam 45. In the embodiment of FIG. 5, a vibration absorber 55 is mounted on the lower outside wall area of the seal 52, which acts as a waveguide to divert the vibrations excited in the seal 52 in a known manner, and absorbs them in itself.

Figure 6:
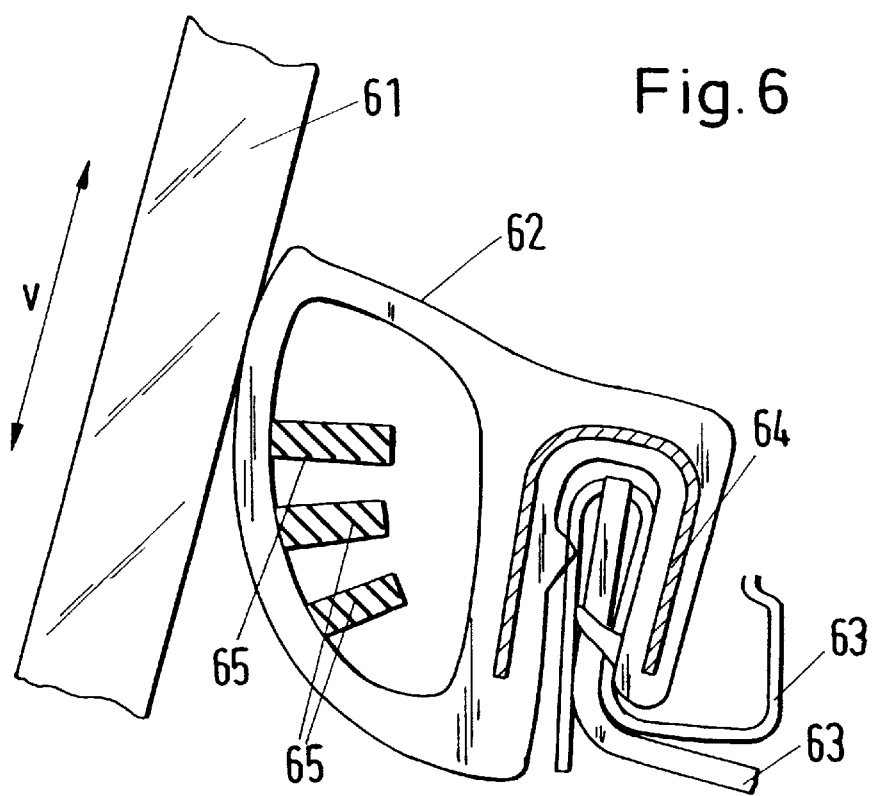

In FIG. 6, resonance absorbers 65 are mounted in a force-locking manner (for example, by gluing) in the interior of the seal 62 on one side on its inside wall, and are tuned to different frequencies. The resonance absorbers 65 are tuned to the natural frequency of the frictional vibration and its harmonics.

Figure 7:
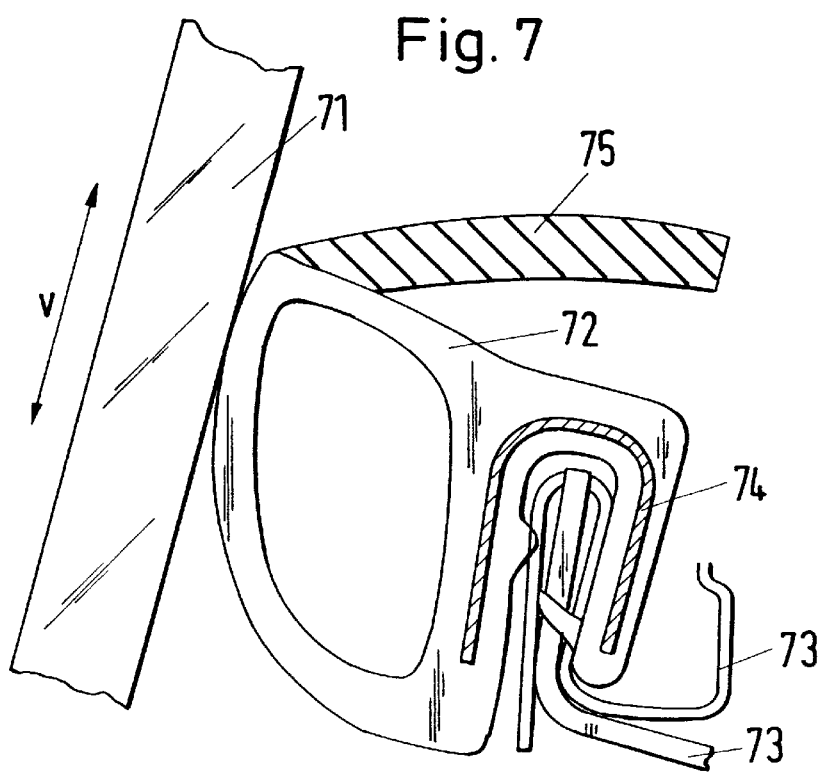

In the embodiment illustrated in FIG. 7, a strip-shaped vibration absorber 75 is mounted on the top side of the seal 72. Because of its larger effective length this vibration absorber is more suitable for the damping of lower frequency vibrations than that according to FIG. 5.

Figure 8:
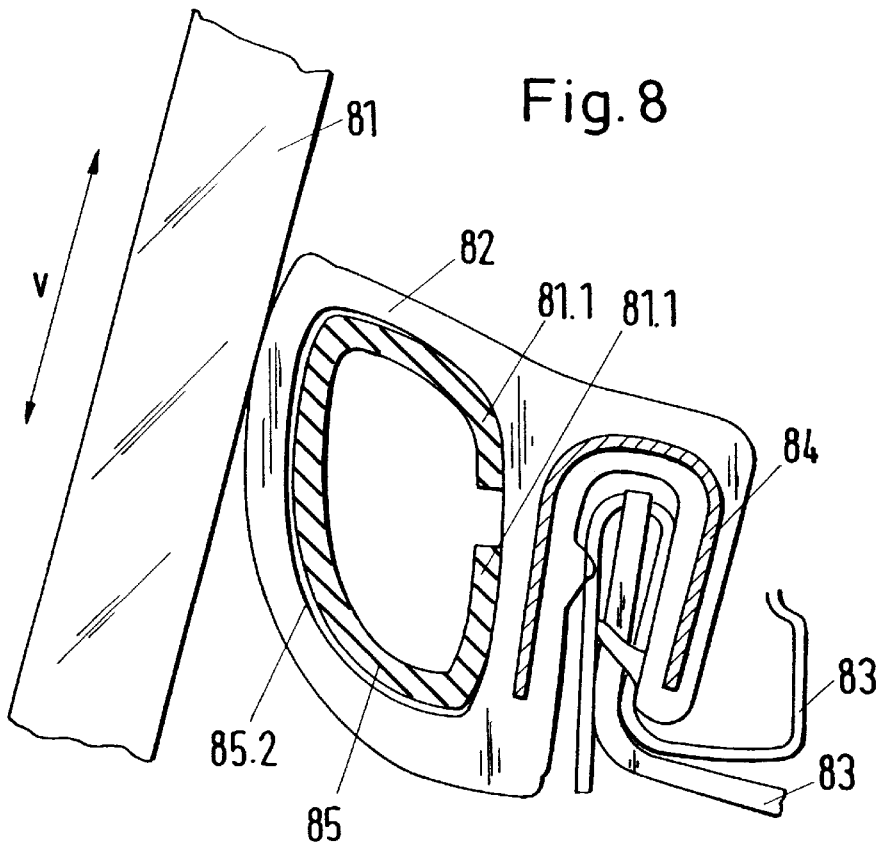

FIG. 8 shows a coating 85 inserted into the interior of the seal 82 and extending parallel to the inside wall of the seal 82. However, this coating 85 is fixedly connected only in areas 81.1 so that it can rub on the inside wall in the area 85.2. Vibrations of the seal 82 are damped in this manner by solid body friction.

In FIG. 9, bending and rotational vibrations of the internal reinforcement 94 are damped by a so-called sandwich or composite system. This is an elastic-viscous layer 95 which is applied to the internal reinforcement 94 and which, in turn, is connected with a stiff covering 92.

In FIG. 10, on the inside of the door, the shaft seal 102 is connected with the door frame 103.2 by means of clips 103.1. Vibrations of the holding clips 103.1 are damped by high-damping elastomers 105 between the clips 103.1 and the door frame 103.2.

Figure 11:
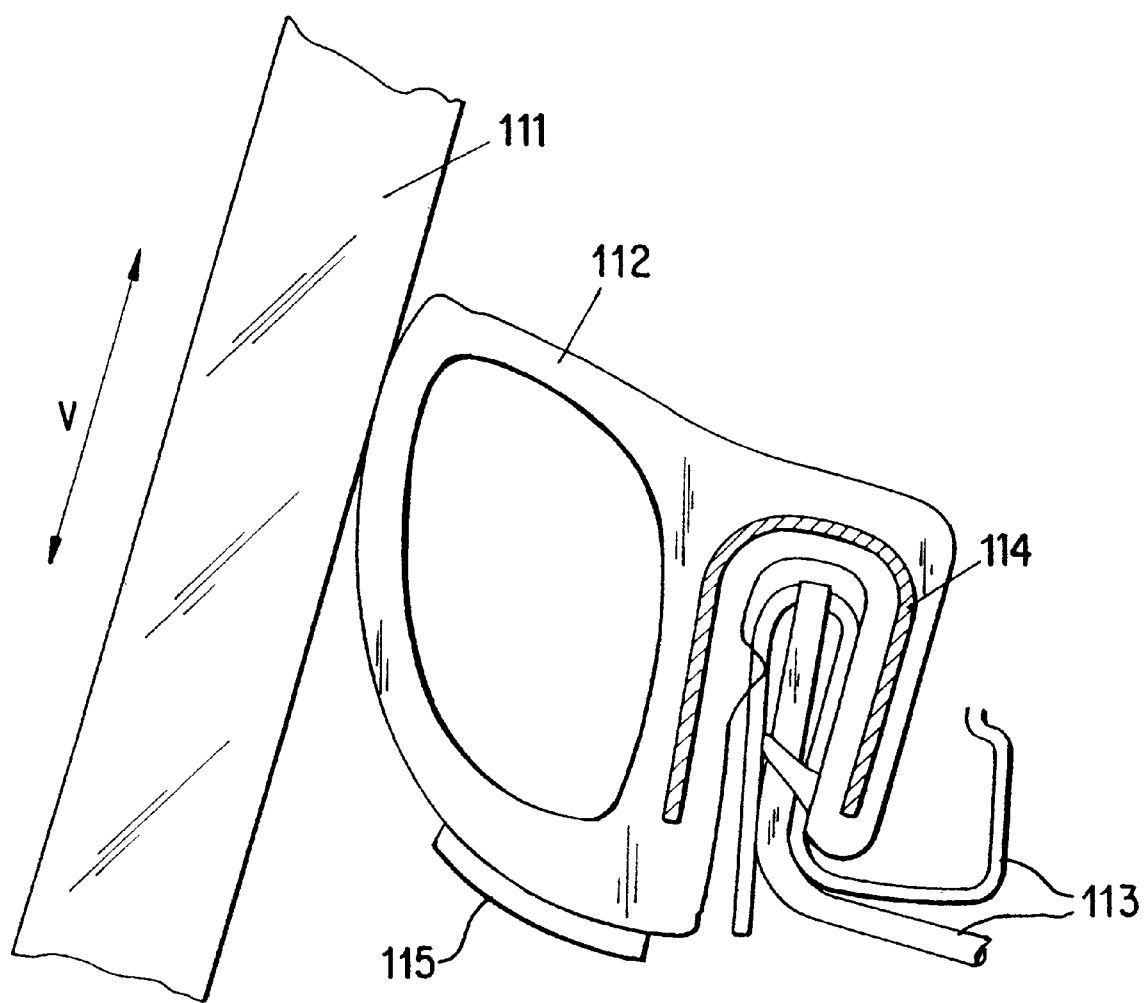

FIG. 11 shows a coating 115 applied to the outside of the seal 112 at the points of maximum deformation in the case of a movement caused by friction on the moving window pane 111. The damping coat 115 consists of a high damping elastomer or a so-called "pressed in coating".

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for avoiding generation of squeaking noises by a window pane which is displaced relative to a sealing element resting thereon, wherein:

said sealing element comprises a hollow strip; and a vibration damping element is coupled to receive vibrations from said sealing element;

wherein said vibration damping element provides an additional modal damping R which satisfies the inequality $$K - F_1 + R > 0$$

K being a constant, and $F_1$ being the first derivative of force exerted by said sealing element with respect to speed of said sealing element.

2. Arrangement according to claim 1 wherein said vibration damping element is arranged in an interior portion of said hollow strip.

3. Arrangement according to claim 2 wherein said vibration damping element comprises a damping coating applied to said hollow strip in an area of maximal deformation thereof due to self excited frictional vibration.

4. Arrangement according to claim 2 wherein a vibration absorbing element is coupled to said sealing element in an area of maximal deformation thereof due to self excited frictional vibration.

5. Arrangement according to claim 2 wherein said vibration damping element comprises a sound absorbing coating applied to interior walls of said hollow strip.

6. Arrangement according to claim 2 wherein said interior portion of said hollow strip is filled with a vibration damping material.

7. Arrangement according to claim 6 wherein said vibration damping material is an elastomer foam.

8. Arrangement according to claim 1 wherein said vibration damping or absorbing element is arranged on an exterior wall of said hollow strip.

9. Arrangement according to claim 1 wherein said vibration damping element comprises a damping coating applied to said hollow strip in an area of maximal deformation thereof due to self excited frictional vibration.

10. Arrangement according to claim 1 wherein a vibration absorbing element is coupled to said sealing element in an area of maximal deformation thereof due to self excited frictional vibration.

11. Arrangement according to claim 10 wherein said vibration absorbing element comprises at least one resonance absorbing element tuned to absorb at least a resonance frequency of said window pane and sealing element.

12. Arrangement according to claim 11 wherein said vibration absorbing element comprises a plurality of resonance absorbing elements tuned to absorb a resonance frequency and harmonics of said window pane and sealing element.

13. Arrangement according to claim 11 wherein said plurality of resonance absorbing elements is mounted on an interior wall of said sealing element.

14. Arrangement to claim 1 wherein said sealing element is fastened to a vehicle body part by means of a fastener made of a vibration absorbing elastomer.

* * * * *